United States Patent [19]
Johnson

[11] 3,775,203
[45] Nov. 27, 1973

[54] SEALING ROLLS WITH YIELDABLE SHOES

[75] Inventor: Harvey C. Johnson, Sheboygan, Wis.

[73] Assignee: Curt G. Joa, Inc., Sheboygan Falls, Wis.

[22] Filed: Nov. 4, 1971

[21] Appl. No.: 195,704

[52] U.S. Cl.................... 156/582, 29/121 A, 101/6, 425/363
[51] Int. Cl....................... B32b 31/00, B21b 27/02
[58] Field of Search.................... 156/580, 582, 220; 425/363, 365; 29/121 A, 121 R; 101/6, 5, 8

[56] References Cited
UNITED STATES PATENTS

| 1,344,007 | 6/1920 | Simpson | 101/6 |
| 2,953,291 | 9/1960 | Huck | 29/121 R |
| 2,447,030 | 8/1948 | Rosenlof | 101/6 |

Primary Examiner—Douglas J. Drummond
Attorney—Wheeler, House & Wheeler

[57] ABSTRACT

Apparatus for sealing the ends of covering sheets for absorbent pads or fillers includes a bed roller with spaced lands and an anvil roller with a plurality of individual anvil shoes or segments which coact with the lands on the roller to emboss links between pads. The anvil shoes are individually adjustably and yieldably mounted in a slot in the anvil roller to compensate for the varying thickness of intervening material and for misalignment or thermal distortion of the heated lands on the bed roller which can cause imperfect heat sealed seams. Biasing springs and adjustment screws for each anvil shoe enable minute independent adjustments of each of the anvil shoes and permit the shoes to yield during use, thus to provide uniform, neat heat sealed bands or embossed strips which secure the fillers within the covering sheets.

11 Claims, 7 Drawing Figures

Inventor
Harvey C. Johnson
By Wheeler, House & Wheeler
Attorneys

PATENTED NOV 27 1973 3,775,203
SHEET 2 OF 2
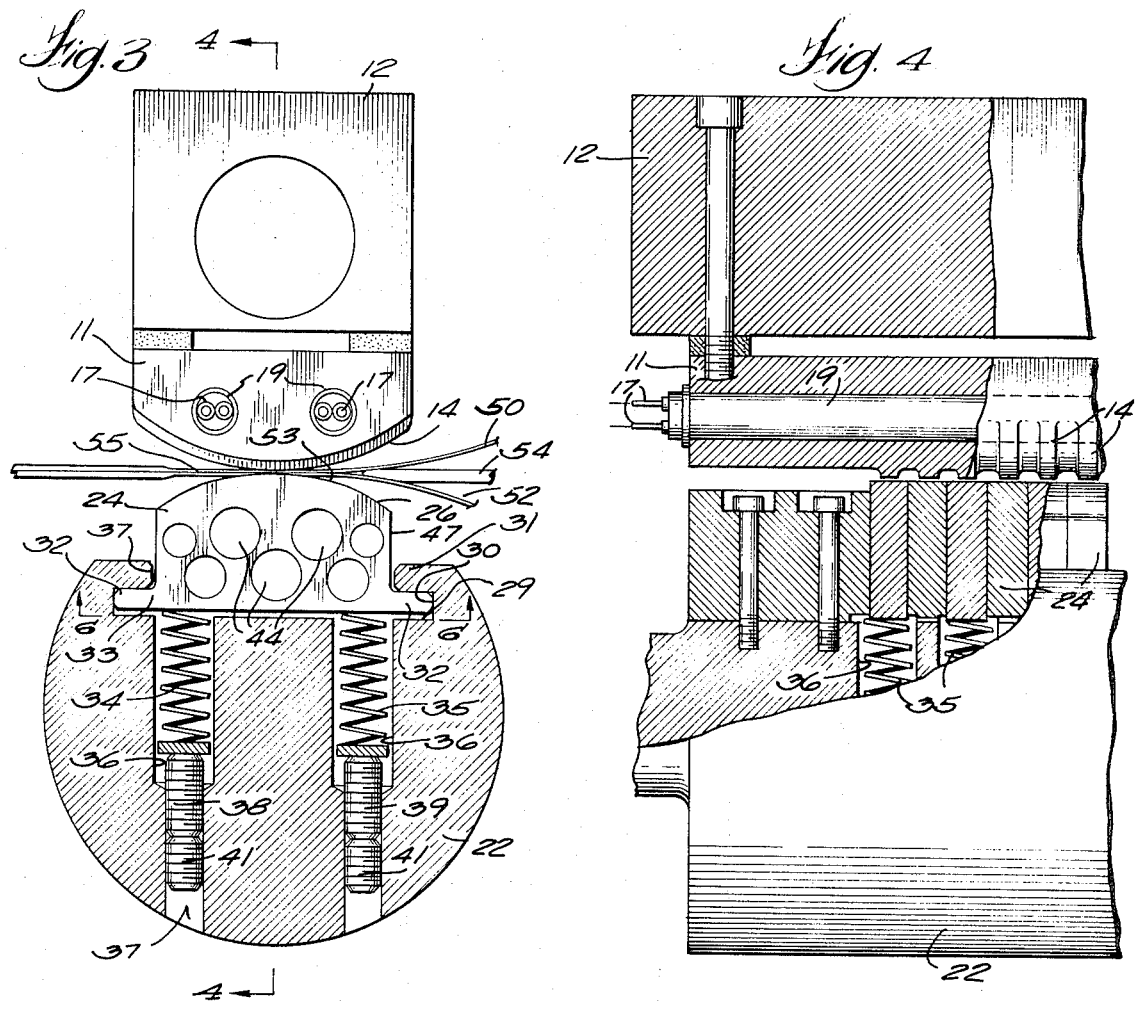
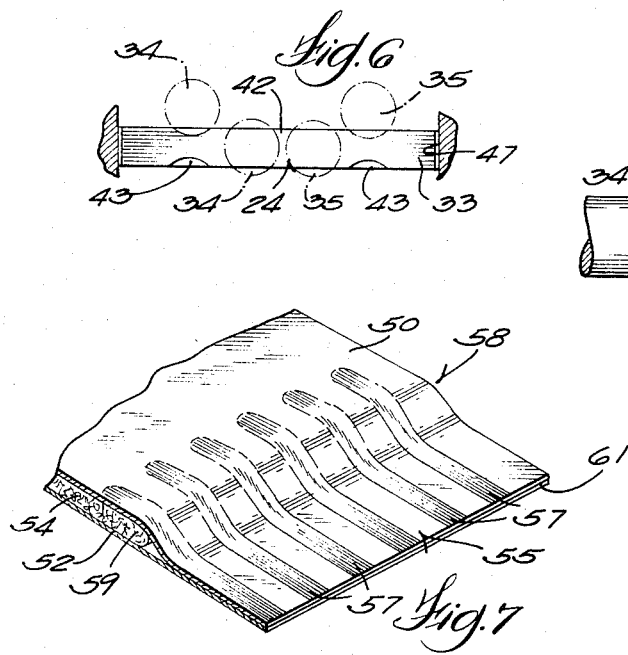
Inventor
Harvey C. Johnson
By Wheeler, House & Wheeler
Attorneys

SEALING ROLLS WITH YIELDABLE SHOES

BACKGROUND OF INVENTION

Prior art apparatus for heat sealing pad or filler covering sheets to enclose the filler includes a bed roller with heated land segments which coact with corresponding lands on an anvil roller. Continuous webs of upper and lower covering sheets with spaced fillers located between the webs are delivered through the gap between the anvil roller and bed roller. The heated lands on the bed roller form heat seal bonds on the covering sheets as the bed roller segments and anvil segments come together. The lands separate as the body of the filler moves between the rollers and again meet to form a heat sealed seam across the succeeding filler gap. Subsequently the pads are separated by a cut-off knife which provides a medial cut in the gaps between the fillers.

Inasmuch as the covering sheets for the fillers are relatively thin, the gaps between the lands on the bed roller and the anvil roller must be within close tolerances to apply uniform and complete heat seal bands. The embossed seals typically overlap thicker pad zones. Slight misalignment between the anvil lands and bed roller lands results in imperfect and nonuniform heat seal seams. Even though the bed roller lands and anvil lands are true and in proper alignment when the bed roll is not heated, thermal and other distortion during use can cause misalignment.

SUMMARY OF INVENTION

The invention overcomes the alignment problems caused by thermal and other distortion of the bed roller lands by providing an anvil roller with a plurality of independently adjustable and yieldable arcuate anvil segments or shoes each of which coacts with an opposed ridge or land segment on the heated bed roll.

The anvil shoes have out-turned tabs which are received in a longitudinal or axial slot in the anvil roller. Inturned retaining flanges on the anvil roller form the top of the slot and are spaced from the base of the slot to provide clearance for the anvil tabs to provide an adjustment and yield range for the anvil shoes. The anvil shoes are arranged in side by side relationship in the slot and have accurately machined abutting side surfaces. Recesses in the side surfaces minimize adhesion between anvil shoe surfaces, thus enabling minute independent adjustments of the position of the segments to compensate for distortion caused by heating of the bed roller. A removable end block on the anvil roller facilitates assembly of the anvil shoes in the slot and secures the anvil shoes in place.

Each anvil shoe desirably has two adjustment screws. The adjustment screws are threadably received in apertures extending through the anvil roller. Counterbores opening into the anvil roller slot carry springs which engage the base of the anvil shoes and yieldably urge the anvil tabs against the inturned slot flanges.

Further objects, features, and advantages of the present invention will become apparent from the following disclosure.

DRAWINGS

FIG. 3 is an enlarged sectional view along line 3—3 of FIG. 1, a workpiece being shown in course of passage through the gap between the bed roll and anvil roll.

FIG. 4 is a fragmentary sectional view along line 4—4 of FIG. 3.

FIG. 5 is a reduced scale fragmentary plan view of the anvil roller shown in FIG. 1.

FIG. 6 is a bottom view of an anvil shoe along line 6—6 of FIG. 3.

FIG. 7 is a fragmentary perspective view of a pad with the covering sheets heat sealed with the apparatus shown in FIGS. 1-5.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
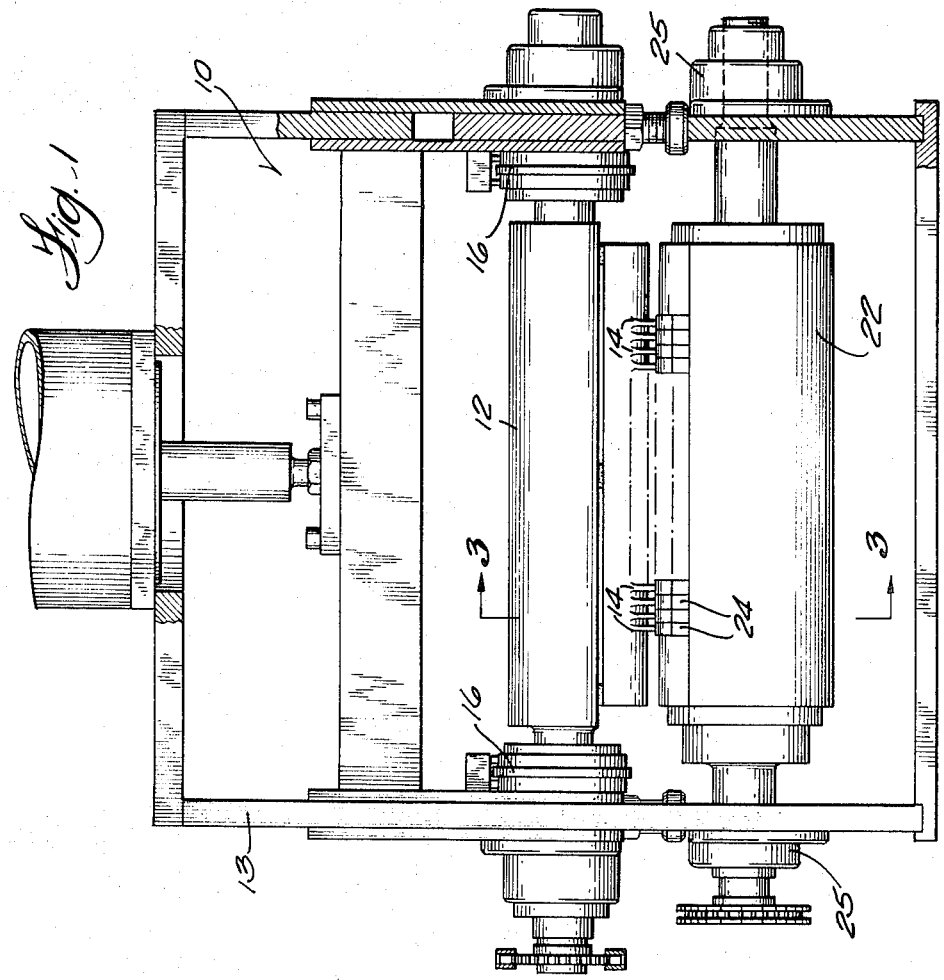
FIG. 1 is a fragmentary end view of heat seal apparatus employing a heated bed roller and embodying the anvil roller of the invention.

The heat sealing apparatus 10 (FIG. 1) includes a bed roller bar 12 rotatably supported in a frame 13 and having a heated face bar 11 formed with a plurality of spaced arcuate lands or ridges 14 (FIGS. 3, 4) which extend axially along the periphery of the roller 12. The lands 14 have a relatively short arcuate extent (approximately 80° in the disclosed embodiment) and are concentric with the axis of roller 12. The face bar 11 of bed roller 12 contains two thermal heating bars or units 17 (FIG. 4) located in axial bores 19 (FIG. 3) for heating the lands 14. Collector assemblies 16 (FIG. 1) at each end of the bed roller 12 connect the heating units 17 to a source of electric current.

Cooperating with bed roll 12 is an anvil roller 22 (FIGS. 1, 3, 4, 5) which is supported in frame 13 by bearings 25 for rotation in adjacent relation to the bed roller 12. The anvil roller 22 is provided with a plurality of separately independently adjustable and yieldable anvil segments or shoes 24, each having an arcuate peripheral surface 26 with an arcuate extent or angular span substantially the same as the bed roller lands 14. The anvil shoes 24 are radially aligned with the lands 14 of the bed roller 12 (FIG. 4).

Figure 2:
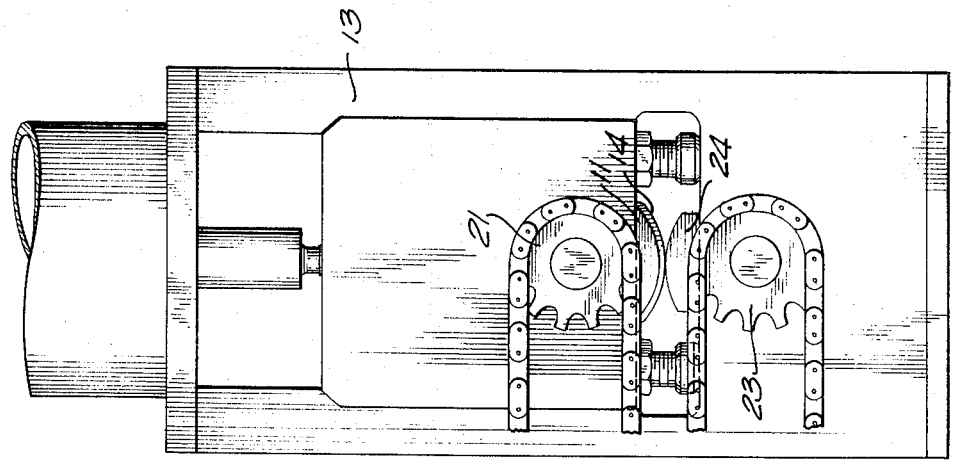
FIG. 2 is a fragmentary side view of the apparatus shown in FIG. 1.

Chains engaged with sprockets 21, 22 (FIG. 2) on the bed roller 12 and anvil roller 22, rotate the bed roller lands 14 in phase with the anvil shoes 24 for intermittent co-action in synchronization with movement of the intervening spaced pads and covering sheets as subsequently described.

Means are provided for adjustably mounting each of the anvil shoes 24 in the anvil roller 22. In the disclosed construction the means includes a longitudinal or axial slot 30 (FIG. 3) in the anvil roller 22 which is open at one end for assemblying the anvil shoes 24 endwise into the slot 30 in a serial array. Each anvil shoe 24 has a base 33 with projecting tabs 32. The tabs 32 are located between the base 29 of the slot 30 and overhanging retaining flanges 31 (FIG. 3) on the anvil roller 22. Sufficient clearance is provided between the flanges 31 and the base 33 of the slot 30 to permit radial adjustment and yielding movement of the anvil shoes as presently described. The ends 37 of the flanges 31 are spaced to embrace the end walls 47 of the anvil shoes.

The means for adjustably and yieldably mounting the anvil shoes 24 also includes two springs 34, 35 (FIGS. 3, 5) for each shoe 24. The springs 34, 35 are located in counterbores 36 of apertures or bores 27 which extend through the anvil roller 22. The counter-bores 36 open into slot 30 to allow the springs 34, 35 to press against the base 33 of the anvil shoe.

Adjustment screws 38, 39 threadably received in the apertures 37 enable adjustment of the tension of the springs 34, 35 and thus the position and degree of yieldability of the anvil shoe 24 in the slot 30. Locking screws 41 can also be employed to fix the adjustment. The adjustment aforesaid permits radial inward and outward movement of the shoe as required to compensate for distortion or misalignment of the opposed bed roller land 14, whether thermally induced or otherwise.

The anvil shoes 24 have accurately machined abutting side surfaces 42 which are provided with a plurality of concave recesses 44 (FIGS. 3, 6) thus to reduce adhesion between abutting surfaces so that minute and independent adjustments of the relative positions of the anvil shoes 22 can be made.

The springs 34, 35 for adjacent anvil shoes 24 are desirably staggered (FIGS. 5 and 6) to enable use of large diameter springs with the desired spring rate. The base 33 of each anvil shoe has appropriately located semicircular recesses 43 (FIG. 6) opening into the side surfaces 42 to receive overlapping edge portions of the springs for the adjacent anvil shoe and prevent imposition of spring pressure from the springs for one shoe on the undersurface of the adjacent shoe. The recesses on adjacent shoes also function as pilots to maintain the springs in centered positions.

In use of the apparatus 10 upper and lower covering sheets or opposed plies 50, 52 of thermo-sealable webbing embracing spaced fillers in the form of bats, pads or wadding material 54 located between the plies 50, 52 (FIG. 3) are fed between the bed roller 12 and anvil roller 22. The lands 14 and anvil shoes 24 come together in synchronization with movement of the covering sheets 50, 52 and the gaps 53 between the bats 54, thus to apply a series of spaced heat seal unions 57 across the web to links 55 between adjacent fillers 54, thus to form a chain of fillers 54 interconnected by the heat sealed links or seams 55 on the covering sheets 50, 52. The unions 57 also overlap the ends 59 of the filler 54 and heat seal the covering sheets 50, 52 to the filler to anchor the filler 54.

Subsequently discrete pads 58 are separated from the chain by transverse cuts 61 midway through the seam 55 (FIG. 7).

The adjustment capability of the anvil shoes 24 enables independent adjustment and yielding of each anvil shoe 24 to adjust the pressure of the shoes against varying thicknesses of the intervening material. This is illustrated in FIG. 7 which shows how the embossed pattern of the seals 57 typically extend throughout the link zone 55 and substantially overlaps the zone of the batts 54. The link zone 55 is very thin, as it consists only in the double ply thickness of the cover sheets 50, 52, each of which is only about 0.001 inches thick. The zone of the batt 54 is much thicker. Accordingly, the anvils 24 must react in each impression to thick and thin intervening material. The independent yielding mounting of each anvil permits it to follow the specific thickness of the intervening material while maintaining at all times a relatively uniform pressure which will not tear the relatively thin cover sheets in link zone 55, nor dig holes through or rupture the sheets in the zone of batts 54. The thicker zone of batts 54 has a cushion effect on the anvils 24, thus further militating against damage to the thin link zone 55.

The disclosed structure enables the anvils to react quickly to varying thickness intervening material even at high speed machine operations and not withstanding thermal and other dislocations in the coacting parts.

I claim:

1. Apparatus for uniting opposed plies of sealable material, said apparatus comprising a bed roller having a series of axially spaced lands, an anvil roller, a corresponding series of anvil shoes coacting with said bed roll lands to apply a seal band interconnecting the opposed plies and means for individually yieldably mounting said shoes in said anvil roller to vary the positions of said shoes relative to said lands, said means including means for individually adjusting the yieldability of said shoes and comprising apertures in said anvil roller communicating with said shoes, springs in said apertures engaging said shoes and screws threadably received in said aperture and engaging said springs to vary the tension on said springs and the position of said shoes in said roller.

2. The apparatus of claim 1 in which one of said series of lands and shoes is heated.

3. Apparatus in accordance with claim 1 wherein said means comprises an axially extending slot in said anvil roller, said anvil shoes having bases slidable along said slot.

4. Apparatus in accordance with claim 1 wherein said slot has a base, and said means includes inturned retaining flanges on said anvil roller partially spanning and defining the top of said slot and spaced from said slot base to freely receive tabs on said anvil shoes.

5. Apparatus in accordance with claim 1 wherein said anvil shoes are in lateral contact, said anvil shoes having machined contacting side surfaces.

6. Apparatus in accordance with claim 5 wherein said side surfaces have recesses to minimize adhesion.

7. In apparatus for applying seal seams to the links between serially connected pads, said apparatus including a bed roller with a plurality of axially spaced lands and an opposed anvil roller, the improvement comprising a serial array of anvil shoes and means for mounting said shoes in said anvil roller to afford independent movement of each of said shoes with respect to its opposed land, said means comprising an axial slot in said roller, said slot being defined by a slot base and inturned flanges spaced from said base and out-turned tabs on each of anvil shoes received in said slot, said means also including two adjustment screws for each of said anvil shoes, and apertures in said anvil roller, said apertures opening into said slot and threadably receiving said adjustment screws.

8. The improvement of claim 7 including springs located in said apertures between said shoes and said screws.

9. The improvement of claim 8 wherein said springs are staggered and overlap adjacent shoes, and recesses in said adjacent shoes to receive said springs.

10. The improvement of claim 7 in which said means further comprises springs against which said anvil shoes are independently yieldable.

11. The improvement of claim 12 in combination with means for heating one of the lands and shoes.

* * * * *